(12) United States Patent
Willems et al.

(10) Patent No.: US 11,473,514 B2
(45) Date of Patent: Oct. 18, 2022

(54) CRAWLED VEHICLE FOR THE PREPARATION OF SKI PISTES

(71) Applicant: PRINOTH S.P.A., Vipiteno (IT)

(72) Inventors: Samuel Willems, Friedrichshafen (DE); Richard Casartelli, Val di Vizze (IT); Georg Lentsch, Kaunerberg (AT); Francesco Salis, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 167 days.

(21) Appl. No.: 16/652,308

(22) PCT Filed: Oct. 23, 2018

(86) PCT No.: PCT/IB2018/058232
§ 371 (c)(1),
(2) Date: Mar. 30, 2020

(87) PCT Pub. No.: WO2019/082065
PCT Pub. Date: May 2, 2019

(65) Prior Publication Data
US 2020/0248639 A1  Aug. 6, 2020

(30) Foreign Application Priority Data

Oct. 23, 2017  (IT) .................. 102017000119992

(51) Int. Cl.
*F02D 41/14* (2006.01)
*F02D 41/00* (2006.01)
(Continued)

(52) U.S. Cl.
CPC .......... *F02D 41/0007* (2013.01); *E01H 4/02* (2013.01); *F02D 2200/0414* (2013.01);
(Continued)

(58) Field of Classification Search
CPC ............. F02D 41/0072; F02D 41/0007; F02D 2200/0414; F02M 26/15; F02M 35/09;
(Continued)

(56) References Cited

U.S. PATENT DOCUMENTS 3,699,683 A * 10/1972 Tourtellotte .......... F01N 3/0878
                                                                  60/274
3,739,583 A *  6/1973 Tourtellotte ........... F02M 26/53
                                                                  60/274
(Continued)

FOREIGN PATENT DOCUMENTS

CN  1593965  3/2005
CN  101031704  9/2007
(Continued)

OTHER PUBLICATIONS

Notification Concerning Submission, Obtention or Transmittal of Priority Document for International Application No. PCT/IB2018/058232 dated Jan. 30, 2019.
(Continued)

*Primary Examiner* — Gonzalo Laguarda
(74) *Attorney, Agent, or Firm* — Neal, Gerber & Eisenberg LLP

(57) ABSTRACT

A crawled vehicle comprising: an internal combustion engine; an engine compartment wherein the internal combustion engine is housed; an air inlet opening to catch air from the outside of the crawled vehicle; a first channel, for cold air, connected and fed by the air inlet opening with air coming from outside the crawled vehicle; a second channel to be fed with hot air coming from the internal combustion engine; a third channel for air, coupled to the internal combustion engine to feed the internal combustion engine with air; an air filter arranged along the third channel and upstream of the internal combustion engine; a connection element connected to the first channel, to the second channel
(Continued)

and third channel; and an air adjusting device to adjust the air temperature in the third channel and comprising a shutter coupled to the first channel and/or to the second channel and/or to the connection element; and a control device controlling a position of the shutter to adjust the temperature of the air entering the third channel.

15 Claims, 4 Drawing Sheets

(51) Int. Cl.
  *E01H 4/02* (2006.01)
  *F02M 35/09* (2006.01)
  *F02M 35/10* (2006.01)
(52) U.S. Cl.
  CPC ....... *F02M 35/09* (2013.01); *F02M 35/10013* (2013.01); *F02M 35/10222* (2013.01)
(58) Field of Classification Search
  CPC ........ F02M 35/10013; F02M 35/10222; E01H 4/02
  See application file for complete search history.

(56) References Cited

U.S. PATENT DOCUMENTS

| | | | | |
|---|---|---|---|---|
| 3,927,523 | A * | 12/1975 | Shioyama | F02D 41/0055 60/278 |
| 4,233,811 | A * | 11/1980 | Masaki | F02D 37/02 60/274 |
| 4,305,249 | A | 12/1981 | Schmid et al. | |
| 4,856,475 | A | 8/1989 | Shimomura et al. | |
| 5,361,860 | A * | 11/1994 | Smith | B62D 55/04 180/190 |
| 5,520,161 | A * | 5/1996 | Klopp | F02D 41/0077 123/676 |
| 6,327,980 | B1 | 12/2001 | Chen et al. | |
| 6,851,414 | B2 * | 2/2005 | Gao | F02M 26/35 123/568.11 |
| 8,276,571 | B2 * | 10/2012 | Zeitoun | F02M 26/46 123/568.11 |
| 8,490,606 | B2 * | 7/2013 | Zeitoun | F02M 26/19 123/568.11 |
| 10,330,034 | B2 * | 6/2019 | Brewbaker | F02D 41/18 |
| 10,393,038 | B2 * | 8/2019 | Wang | F02M 26/06 |
| 2006/0100796 | A1 | 5/2006 | Fraden et al. | |
| 2011/0042599 | A1* | 2/2011 | Arai | F16K 1/2266 251/251 |
| 2013/0046424 | A1 | 2/2013 | Gallagher et al. | |
| 2015/0275828 | A1 | 10/2015 | Zocher et al. | |
| 2016/0281655 | A1 | 9/2016 | Yoshioka et al. | |
| 2017/0298810 | A1 | 10/2017 | Thompson et al. | |

FOREIGN PATENT DOCUMENTS

| | | |
|---|---|---|
| CN | 102828840 | 12/2012 |
| CN | 103670596 | 3/2014 |
| CN | 103790696 | 5/2014 |
| CN | 103797225 | 5/2014 |
| CN | 104968925 | 10/2015 |
| CN | 105050886 | 11/2015 |
| CN | 105422297 | 3/2016 |
| CN | 105849384 | 8/2016 |
| CN | 105980177 | 9/2016 |
| CN | 106050418 | 10/2016 |
| CN | 106256572 | 12/2016 |
| CN | 205908373 | 1/2017 |
| DE | 102005058441 | 6/2006 |
| GB | 1 259 986 | 1/1972 |
| GB | 2 178 482 | 2/1987 |
| JP | 2000238688 | 9/2000 |
| JP | 2005201204 | 7/2005 |
| JP | 2008284953 | 11/2008 |
| JP | 2016125431 | 7/2016 |
| WO | WO 2017/134636 | 8/2017 |

OTHER PUBLICATIONS

International Search Report and Written Opinion for International Application No. PCT/IB2018/058232 dated Feb. 12, 2019.
Office Action and Search Report for Chinese Application No. 201811234276.0 dated Jun. 15, 2021 (11 pages).

* cited by examiner

CRAWLED VEHICLE FOR THE PREPARATION OF SKI PISTES

PRIORITY CLAIM

This application is a national stage application of PCT/IB2018/058232, filed on Oct. 23, 2018, which claims the benefit of and priority to Italian Patent Application No. 102017000119992, filed on Oct. 23, 2017, the entire contents of which are each incorporated by reference herein.

TECHNICAL FIELD

The present disclosure relates to a crawler vehicle for the preparation of ski pistes.

In particular, the present disclosure relates to a crawler vehicle for the preparation of ski pistes, in particular a snowgroomer, comprising an internal combustion engine; an external air channel; an air inlet opening connected to the external air channel; and an air filter that filters the external air of the external air channel before it is supplied to the internal combustion engine.

BACKGROUND

One drawback of certain of the prior art is that crawled vehicles for the preparation of ski piste operate in snowy environments and in these circumstances snow enters the air filter causing clogging. In such cases, the external air does not reach the internal combustion engine or arrives in reduced amount and the internal combustion engine is unable to work at its relative best.

SUMMARY

It is a purpose of the present disclosure to provide a crawled vehicle capable of reducing certain of the inconvenience of certain of the prior art solutions.

According to the present disclosure there is provided a crawled vehicle for the preparation of ski pistes, in particular a snowgroomer; the crawled vehicle comprising:
  an internal combustion engine;
  an engine compartment wherein the internal combustion engine is housed;
  an air inlet opening to receive air from the outside of the crawled vehicle;
  a first channel for cold air and connected to the air inlet opening to be fed with cold air coming from outside the crawled vehicle;
  a second channel for hot air, such as connected to the engine compartment, to be fed with hot air coming from the internal combustion engine;
  a third channel for air coupled to the internal combustion engine to feed the internal combustion engine with air;
  an air filter arranged along the third channel and upstream of the internal combustion engine to filter the air directed to the internal combustion engine;
  a connection element connected to the first channel, to the second channel and to the third channel; and
  an air adjusting device configured to adjust the air temperature in the third channel and comprising a shutter that is coupled to the first channel or to the second channel or to the connection element and a control device which controls the shutter to adjust the temperature of the air entering the third channel.

In accordance with the present disclosure, the control device of the air control device adjusts a position of the shutter so that the air entering the third channel has a temperature capable of dissolving residues of snow within the filter and consequently avoiding the clogging of the air filter.

According to another embodiment, the control device comprises an actuator, such as an electric or hydraulic or pneumatic actuator, coupled to the shutter to check the position of the shutter so as to adjust the amount of air from the first channel and/or from the second channel entering the third channel.

According to another embodiment, the control device comprises a position sensor for detecting the position of the actuator.

According to another embodiment, the control device comprises a first temperature sensor coupled to the third channel to measure a first temperature which is indicative of the air temperature in a point of the third channel and to adjust the position of the shutter on the basis of the first air temperature measured.

According to another embodiment, the control device comprises a second temperature sensor housed at the outside of the crawled vehicle or into the first channel to measure a second temperature which is indicative of the temperature of the external air and entering the first channel and to adjust the position of the shutter or the external temperature detected.

According to another embodiment, the crawler vehicle comprises a turbine arranged along the third channel between the filter and the internal combustion engine; a cooler arranged along the third channel between the turbine and the internal combustion engine; and wherein the control device comprises a third temperature sensor arranged between the cooler and the internal combustion engine to measure a third air temperature downstream of the cooler and to adjust the position of the shutter according to the third temperature measured.

According to another embodiment comprising an exhaust gas recirculation mixing valve for feeding the internal combustion engine with air mixed with a mixture of exhaust gases and air caught from the outside; the mixing valve is fed by the third channel and is arranged upstream of the internal combustion engine and downstream of the cooler; the control device comprising a fourth temperature sensor to measure a fourth mixed air temperature and check the position of the shutter on the basis of the fourth temperature.

According to another embodiment, wherein the control device comprises a load sensor of the engine coupled to the internal combustion engine and configured to detect a load datum of the engine which can indicate the delivery power of the internal combustion engine in relation to the maximum deliverable power of the internal combustion engine; the control device adjusting the position of the shutter on the basis of the load datum of the internal combustion engine.

According to another embodiment, wherein the control device comprises a clogging sensor coupled to the air filter and configured to detect a clogging of the air filter caused by snow; the control device being configured to adjust the position of the shutter on the basis of the data detected by the clogging sensor.

According to another embodiment, the control device comprises a memory in which a plurality of value couples is stored, wherein one of the values of the value couples refers to a temperature of the air entering the internal combustion engine, and the other value is a datum referring to the performance of the internal combustion engine; the control device is configured to adjust the position of the shutter on the basis of the plurality of values couples stored in the memory.

According to another embodiment, the shutter is housed inside the connection element and is movable among a plurality of positions comprised between a first position wherein the air flow entering from the first channel is obstructed and a second position wherein the air flow entering from the second channel is obstructed to adjust the air flow entering from the first channel and/or from the second channel.

According to another embodiment, the crawler vehicle comprises a frame; two wheel assemblies arranged on opposite sides of the frame; and two crawls, each of which respectively wrapped around one of the two wheel assemblies.

Additional features are described in, and will be apparent from the following Detailed Description and the figures.

BRIEF DESCRIPTION OF THE DRAWINGS

Further features and advantages of the present disclosure will be apparent from the following description of a non-limiting embodiment thereof, with reference to the attached figures, wherein.

DETAILED DESCRIPTION

Figure 1:
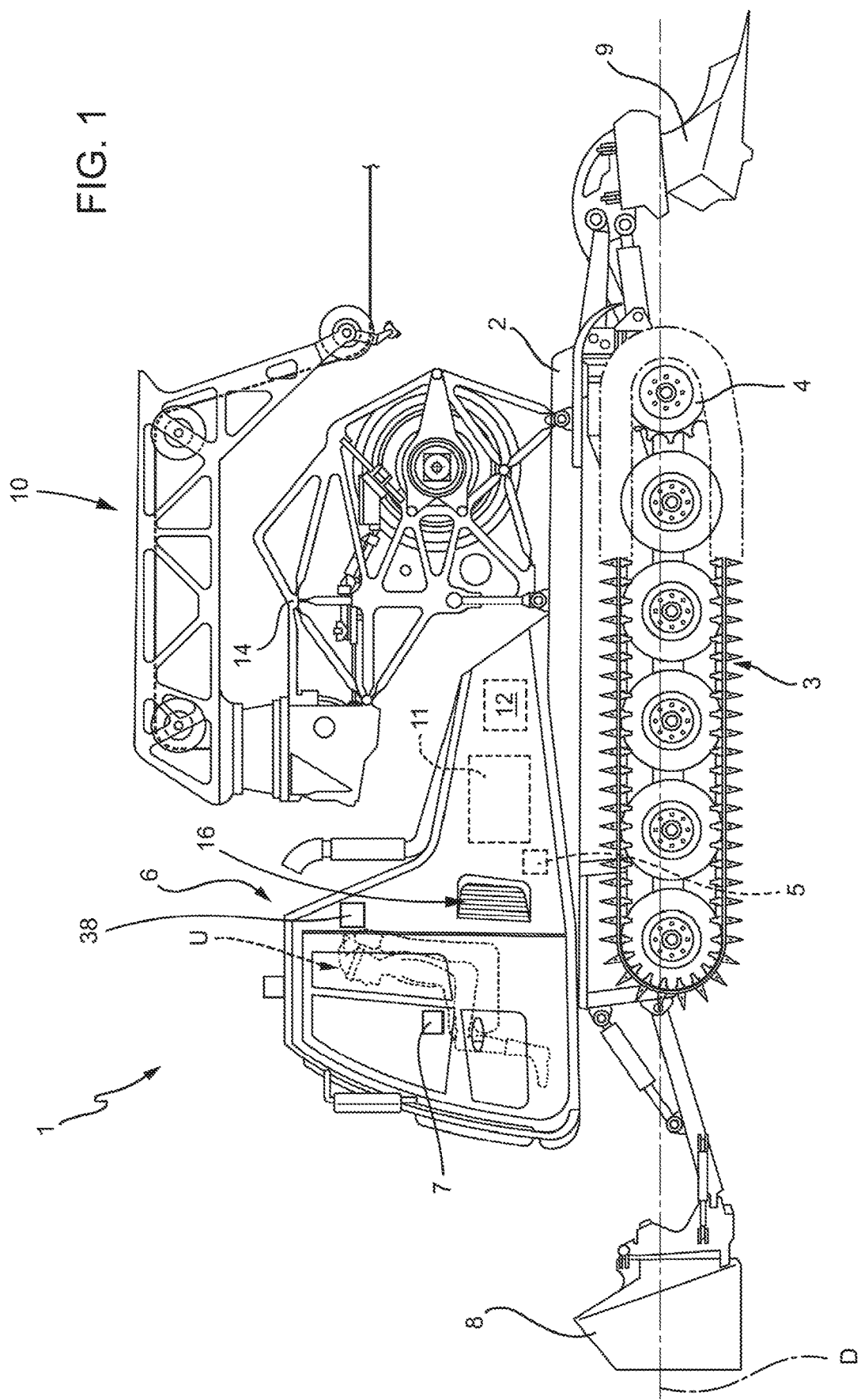
FIG. 1 is a side elevation view, with parts removed for clarity, of a crawled vehicle constructed in accordance with the present disclosure.

With reference to FIG. 1, reference numeral 1 indicates, as a whole, a crawled vehicle for the preparation of ski pistes, in particular a snowgroomer, suitable to be driven in a travel direction D (FIG. 4) onto a snowy path.

With reference to FIG. 1, the crawled vehicle 1 comprises a frame 2; two wheel assemblies 3 (only one visible in FIG. 1) and arranged on opposite sides of the frame 2; and two crawls 4, each of which respectively wrapped around one of the two wheel assemblies 3.

Figure 4:
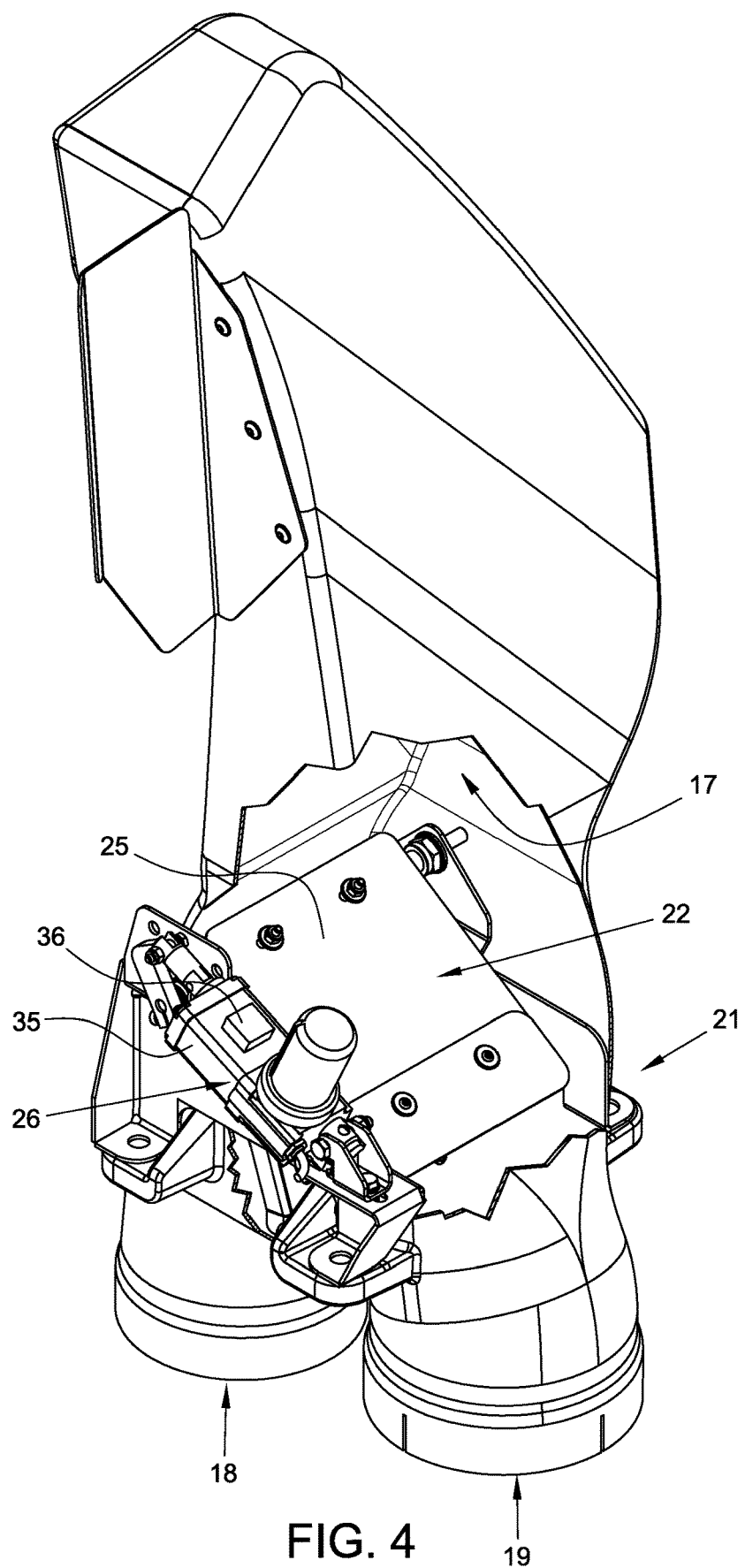
FIG. 4 is a perspective view, with parts removed for clarity, of the detail of the crawled vehicle of FIG. 3 at a different angle with respect to FIG. 3.

With reference to FIGS. 1 and 4, the frame 2 extends along an axis A and supports the wheel assemblies 3.

With reference to FIG. 1, the crawled vehicle 1 comprises a control unit 5; a cabin 6; a user interface 7 arranged in the cabin 6; a blade 8 which is frontally supported by the frame 2; a mill 9 supported at the rear by the frame 2; a winch assembly 10 attached above the frame 2; an internal combustion engine 11; and a power transmission 12 operatively connected to the internal combustion engine 11, wheel assemblies 3, blade 8, mill 9, and winch assembly 10. The power transmission 12 can be hydraulic or electric or a hydraulic and electric combination.

Figure 2:
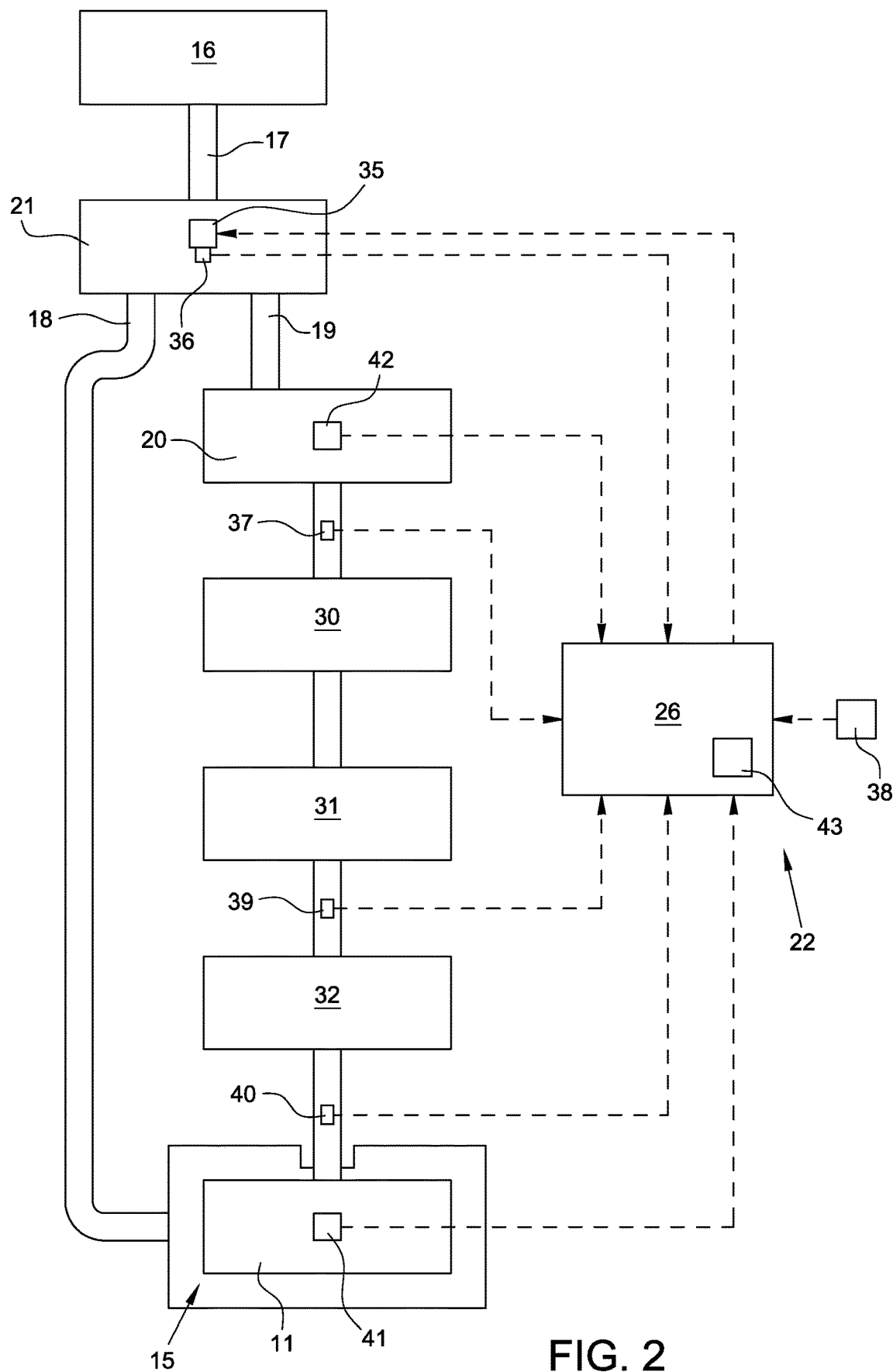
FIG. 2 is a schematic view of a detail of crawled vehicle of FIG. 1.

Also with reference to the attached FIGS. 1 and 2, the crawled vehicle comprises an engine compartment 15 inside which is housed the internal combustion engine 11; an air inlet opening 16 to catch air from the outside of the crawled vehicle 1; a first channel 17 connected and fed by the air inlet opening 16 with air coming from outside; a second channel 18 of hot air connected to the engine compartment 15 to be fed with hot air from the engine compartment 15 heated by the internal combustion engine 11; a third channel 19 of air coupled to the internal combustion engine 11 to feed the internal combustion engine 11 with air; an air filter 20 arranged along the third channel 19 and upstream of the internal combustion engine 11; a connection element 21 connected to the first channel 17, second channel 18 and third channel 19; and an air adjusting device 22 to adjust the air temperature in the third channel 19.

Also with reference to FIG. 2, the crawled vehicle 1 comprises a turbine 30 arranged along the third channel 19 and downstream of the air filter 20 and connected to the air filter 20 to receive air; a cooler 31 arranged along the third channel 19, downstream of the turbine 30 and connected to the turbine 30 to receive and cool the air exiting the turbine 30; an exhaust gas recirculation valve 32 connected to the third channel 19, downstream of the cooler 31 and upstream of the internal combustion engine 11 configured to mix air coming from the third channel 19, in particular from the turbine 31, and the exhaust gas from the internal combustion engine 11 and feeding the internal combustion engine 11 with said mixture of air.

Figure 3:
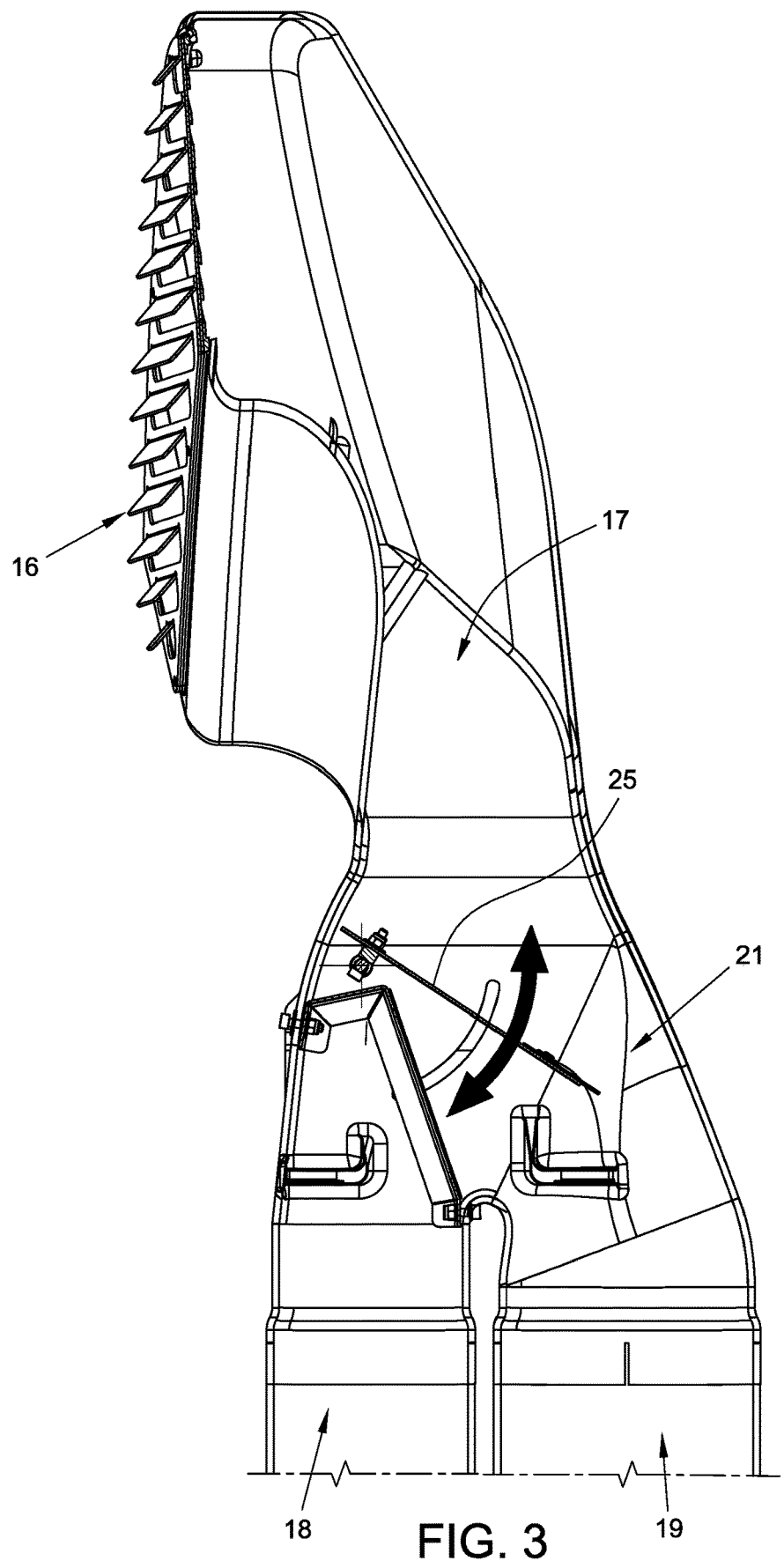
FIG. 3 is a perspective view, with parts shown as cross-sectional views, of a detail of the crawled vehicle constructed in accordance with an embodiment of the present disclosure.

With reference to FIGS. 3 and 4, the air adjusting device 22 comprises a shutter 25 coupled to the connection element 21 and a control device 26 which controls the shutter 25 to adjust the temperature of the air entering the third channel 19. In greater detail, the shutter 25 is housed inside the connection element 21 and is configured to adjust the air coming from the first channel 17 and the second channel 18. In greater detail, the shutter 25 is arranged in a point of the connection element 21 wherein the first and the second channel 17 and 18 are interconnected. The shutter 25 is movable and can assume different positions between a first position and a second position. In the first position, the shutter 25 completely closes the entrance to the air coming from the first channel 17 and is fully open to the air coming from the second channel 18. In the second position the shutter 25 completely closes the entrance to the air coming from the second channel 18 and is fully open to the air coming from the first channel 17. In the intermediate positions between the first and the second position, the shutter 25 adjusts the air flow coming from the first channel 17 and the second channel 18. In particular, when the shutter 25 is moved from the first position to the second position, the air coming from the first channel 18 increases and the air coming from the second channel decreases with respect to the first position. In addition, when the shutter 25 is moved from the second position to the first position, the air coming from the second channel 18 increases and the air coming from the first channel 17 decreases with respect to the second position.

In an alternative embodiment of the present disclosure (not shown in the attached figures), the shutter of the air adjusting device is coupled exclusively to the first channel and adjusts the air flow exiting the first channel.

In an alternative embodiment of the present disclosure (not shown in the attached figures), the shutter of the air adjusting device is coupled exclusively to the second channel and adjusts the air flow exiting the second channel.

In an alternative embodiment of the present disclosure (not shown in the attached figures), the air adjusting device comprises a first and a second shutter, wherein the first shutter is coupled exclusively to the first channel and adjusts the air flow coming from the first channel; the second shutter is coupled exclusively to the second channel and adjusts the air flow coming from the second channel.

With reference to FIG. 4, the control device 26 comprises an actuator 35 such as an electric or hydraulic or pneumatic actuator, coupled to the shutter 25 to control the position of the shutter 25 in such a way as to adjust the amount of air from the first channel 17 and/or from the second channel 18 entering the third channel 19. In greater detail, the actuator 35 adjusts the position of the shutter 25 between the first position and the second position.

Furthermore, with reference to FIGS. 2 and 4, the control device 26 comprises a position sensor 36 configured to detect the position of the actuator 35. The control device 26 adjusts the position of the shutter 25 by the actuator 35, on the basis of the position detected by the position sensor 36, so that the control device 26 performs a feedback control on the position of the shutter 25.

With reference to FIG. 2, the control device 26 comprises a first temperature sensor 37 coupled to the third channel 19 to measure a first temperature which is indicative of the air temperature in a point of the third channel 19 and adjust the position of the shutter 25 on the basis of the first air temperature measured. In greater detail, the first temperature sensor 37 is arranged between the air filter 20 and the turbine 30 and the first temperature indicates the temperature of the air exiting the air filter 20 and entering the turbine 30.

Furthermore, the control device 26 comprises a second temperature sensor 38 housed on the outside of the crawled vehicle 1 to measure a second temperature which is indicative of the temperature of the external air and entering the first channel 17. The control device 26 is configured to adjust the position of the shutter 25, by the actuator 35, on the basis of the second detected temperature.

The control device 26 comprises a third sensor 39 arranged along the third channel between the cooler 31 and the internal combustion engine 11, in particular between the cooler 31 and the exhaust gas recirculation valve 32 to measure a third temperature of the air exiting the cooler 31 and entering the exhaust gas recirculation valve 32. The control device 26 is configured to adjust the position of the shutter 25, by the actuator 35, on the basis of the third temperature measured.

Furthermore, the control device 26 comprises a fourth temperature sensor 40 to measure a fourth mixed air temperature 40 arranged between the exhaust gas recirculation valve 32 and the internal combustion engine 11 to measure the temperature of the mixed air exiting the exhaust gas recirculation valve 32 and entering the internal combustion engine 11. The control device 26 is configured to control the position of the shutter 25, by the actuator 35, on the basis of the fourth temperature.

With reference to FIG. 2, the control device 26 comprises a load sensor 41 of the engine coupled to the internal combustion engine 11 and configured to detect a load datum of the internal combustion engine 11 indicative of a percentage of actual delivery power with respect to the maximum deliverable power that can be delivered by the internal combustion engine 11. The control device 26 is configured to adjust the position of the shutter 25, by the actuator 35, on the basis of the load datum of the internal combustion engine 11.

With reference to FIG. 2 the control device 26 comprises a clogging sensor 42 coupled to the air filter 20 and configured to detect a clogging of the air filter 20 caused by snow. The control device 26 being configured to adjust the position of the shutter 35, by the actuator 35, on the basis of the data detected by the clogging sensor 42.

Furthermore, the control device 26 comprises a memory 43 wherein are stored a plurality of values couples, wherein one of the values of the values couple is indicative of a temperature of the air entering the internal combustion engine 11, in other words it is a value of the fourth temperature; and the other value is a datum referring to the performance of the internal combustion engine 11. The control device 26 is configured to adjust the position of the shutter 25, by the actuator 35, on the basis of the plurality of values couples stored in the memory.

In accordance with the present disclosure, the control device 26 adjusts the temperature of the air entering the third channel 19 so that the air filter 20 is not clogged by snow and to obtain the maximum performance achievable of the internal combustion engine 11. In other words, the control device 26 adjusts the temperature of the air entering the third channel 19 to a value such that it is able to dissolve any snow residues in the air filter 20 or such that avoids a clogging caused by snow in the air filter 20. Furthermore, the control device 26 adjusts the temperature of the air entering the third channel 19 also to maximize the efficiency of the internal combustion engine 11, so that the air entering the internal combustion engine 11 is at a proper temperature (i.e., a temperature that maximizes the efficiency of the internal combustion engine 11).

Furthermore, it is evident that the present disclosure also covers embodiments not described in the detailed description and equivalent embodiments, which fall within the scope of protection of the appended claims. Accordingly, various changes and modifications to the presently disclosed embodiments will be apparent to those skilled in the art.

The invention claimed is:

1. A crawled vehicle comprising:
    an internal combustion engine;
    an engine compartment housing the internal combustion engine;
    an air inlet configured to catch air from outside of the crawled vehicle;
    a first channel connected to the air inlet and configured to receive air coming from outside of the crawled vehicle;
    a second channel configured to receive hot air coming from the internal combustion engine;
    a third channel coupled to the internal combustion engine and configured to feed the internal combustion engine with air;
    an air filter arranged along the third channel upstream of the internal combustion engine;
    a connection element connected to: the first channel, the second channel, and the third channel; and
    an air adjusting device comprising:
        a shutter coupled to at least one of the first channel, the second channel, and to the connection element, and
        a control device comprising a clogging sensor coupled to the air filter and configured to detect a clogging of the air filter caused by snow, the control device configured to control, based on data detected from the clogging sensor, a position of the shutter to adjust a temperature of the air entering the third channel.

2. The crawled vehicle of claim 1, wherein the second channel is connected to the engine compartment.

3. The crawled vehicle of claim 1, wherein the control device comprises an actuator coupled to the shutter and configured to further control the position of the shutter to adjust an amount of air that enters the third channel from at least one of the first channel and the second channel.

4. The crawled vehicle of claim 3, wherein the control device comprises a position sensor configured to detect the position of the actuator.

5. The crawled vehicle of claim 1, wherein the control device comprises a temperature sensor coupled to the third channel and configured to measure a temperature indicative of a temperature of air at a point of the third channel, wherein the control device is configured to further control the position of the shutter based on the measured temperature.

6. The crawled vehicle of claim 1, wherein the control device comprises a temperature sensor housed on the outside of the crawled vehicle and configured to measure a temperature indicative of a temperature of external air entering the first channel, wherein the control device is configured to further control the position of the shutter based on the temperature measured.

7. The crawled vehicle of claim 1, wherein the control device comprises a temperature sensor housed in the first channel and configured to measure a temperature indicative of a temperature of external air entering the first channel, wherein the control device is configured to further control the position of the shutter based on the temperature measured.

8. The crawled vehicle of claim 1, further comprising:
a turbine arranged along the third channel between the air filter and the internal combustion engine;
a cooler arranged along the third channel between the turbine and the internal combustion engine; and
a first temperature sensor of the control device arranged between the cooler and the internal combustion engine and configured to measure a first temperature of air exiting the cooler;
wherein the control device is configured to further control the position of the shutter based on the first temperature measured.

9. The crawled vehicle of claim 8, further comprising:
an exhaust gas recirculation valve configured to feed the internal combustion engine with mixed air comprising exhaust gases of the internal combustion engine and air from the third channel, the exhaust gas recirculation valve is configured to be fed by the third channel and is arranged upstream of the internal combustion engine and downstream of the cooler; and
a second temperature sensor of the control device arranged between the exhaust gas recirculation valve and the internal combustion engine and configured to measure a second temperature of the mixed air;
wherein the control device is configured to further control the position of the shutter based on the measured second temperature.

10. The crawled vehicle of claim 1, wherein:
the control device comprises a load sensor coupled to the internal combustion engine and configured to detect a load datum of the internal combustion engine indicative of a percentage of instantaneous delivery power provided with respect to a maximum deliverable power; and
the control device is configured to further control the position of the shutter based on the detected load datum of the internal combustion engine.

11. The crawled vehicle of claim 1, wherein:
the control device comprises a memory storing a plurality of values couples, each values couple comprising a value of a temperature of air entering the internal combustion engine, and a value of a performance of the internal combustion engine; and
the control device is configured to further control the position of the shutter based on the plurality of values couples stored in the memory.

12. The crawled vehicle of claim 1, wherein the shutter is housed inside the connection element and is movable among a plurality of positions to adjust air flow entering from at least one of the first channel and the second channel, the plurality of positions including a first position where the first channel is sealed and a second position where the second channel is sealed.

13. The crawled vehicle of claim 1 further comprising:
a frame;
two wheel assemblies arranged on opposite sides of the frame;
a first crawl wrapped around a first of the two wheel assemblies; and
a second crawl wrapped around a second of the two wheel assemblies.

14. A crawled vehicle air temperature adjustment system comprising:
a first channel connected to an air inlet of a crawled vehicle and configured to receive air coming from outside of the crawled vehicle;
a second channel configured to receive hot air coming from an internal combustion engine of the crawled vehicle;
a third channel coupled to the internal combustion engine of the crawled vehicle and configured to feed the internal combustion engine of the crawled vehicle with air;
an air filter arranged along the third channel upstream of the internal combustion engine of the crawled vehicle;
a connection element connected to: the first channel, the second channel, and the third channel; and
an air adjusting device comprising:
a shutter coupled to at least one of the first channel, the second channel, and to the connection element, and
a control device comprising a clogging sensor coupled to the air filter and configured to detect a clogging of the air filter caused by snow, the control device configured to control, based on data detected from the clogging sensor, a position of the shutter to adjust a temperature of air entering the third channel.

15. A crawled vehicle comprising:
an internal combustion engine;
an engine compartment housing the internal combustion engine;
an air inlet configured to catch air from outside of the crawled vehicle;
a first channel connected to the air inlet and configured to receive air coming from outside of the crawled vehicle;
a second channel configured to receive hot air coming from the internal combustion engine;
a third channel coupled to the internal combustion engine and configured to feed the internal combustion engine with air;
an air filter arranged along the third channel upstream of the internal combustion engine;
a connection element connected to: the first channel, the second channel, and the third channel;
a turbine arranged along the third channel between the air filter and the internal combustion engine;
a cooler arranged along the third channel between the turbine and the internal combustion engine;
an exhaust gas recirculation valve configured to feed the internal combustion engine with mixed air comprising exhaust gases of the internal combustion engine and air from the third channel, the exhaust gas recirculation valve arranged upstream of the internal combustion engine, downstream of the cooler, and configured to be fed by the third channel; and an air adjusting device comprising:
- a shutter coupled to at least one of the first channel, the second channel, and to the connection element, and
- a control device comprising:
  - a first temperature sensor arranged between the cooler and the internal combustion engine, the first temperature sensor configured to measure a first temperature of air exiting the cooler, and
  - a second temperature sensor arranged between the exhaust gas recirculation valve and the internal combustion engine and configured to measure a second temperature of the mixed air,
  - wherein the control device is configured to control, based on the first temperature measured, a position of the shutter to adjust a temperature of the air entering the third channel, and configured to further control the position of the shutter based on the measured second temperature.

\* \* \* \* \*